United States Patent [19]

Knott, II et al.

[11] 4,239,826

[45] Dec. 16, 1980

[54] MULTI-LAYER BARRIER FILM

[75] Inventors: Jack E. Knott, II, Menasha; James C. Wang, Appleton, both of Wis.

[73] Assignee: American Can Company, Greenwich, Conn.

[21] Appl. No.: 973,925

[22] Filed: Dec. 28, 1978

[51] Int. Cl.³ .................... B32B 9/04; B32B 27/08
[52] U.S. Cl. ............................ 428/35; 428/411;
428/500; 428/516; 428/518; 428/520; 428/522;
428/475.8
[58] Field of Search ............... 428/35, 411, 474, 500,
428/516, 518, 520, 522

[56] References Cited

U.S. PATENT DOCUMENTS

| | | | |
|---|---|---|---|
| 2,386,347 | 10/1945 | Roland, Jr. | 260/86 |
| 2,399,653 | 5/1946 | Roland, Jr. | 260/88 |
| 2,941,973 | 6/1960 | Kumnick et al. | 260/30.6 |
| 2,983,696 | 5/1961 | Tocker | 260/23 |
| 3,114,736 | 12/1963 | Bartl et al. | 260/87.3 |
| 3,172,876 | 3/1965 | Koch et al. | 260/85.7 |
| 3,344,129 | 9/1967 | Korbanka et al. | 260/87.3 |
| 3,386,978 | 6/1968 | Salyer | 260/87.3 |
| 3,419,654 | 12/1968 | Chiba et al. | 264/210 |
| 3,510,463 | 5/1970 | Bristol | 260/87.3 |
| 3,510,464 | 5/1970 | Sato | 260/87.3 |
| 3,523,933 | 8/1970 | Inskip | 260/89.1 |
| 3,560,325 | 2/1971 | Sogi et al. | 428/516 X |
| 3,560,461 | 2/1971 | Yonezu et al. | 260/87.3 |
| 3,562,234 | 2/1971 | Resz et al. | 260/87.3 |
| 3,585,177 | 6/1971 | Gardner et al. | 260/87.3 |
| 3,595,740 | 7/1971 | Gerow | 428/474 X |
| 3,780,004 | 12/1973 | Hoyt | 260/87.3 |
| 3,847,845 | 11/1974 | Tada | 521/62 |
| 3,882,259 | 5/1975 | Nohara et al. | 428/516 X |
| 3,887,649 | 6/1975 | Takida et al. | 260/42.18 X |
| 3,890,267 | 6/1975 | Fukushima et al. | 260/42.18 |
| 3,908,070 | 9/1975 | Marzolf | 428/516 X |
| 3,925,336 | 12/1975 | Sawada | 260/87.3 |
| 3,926,876 | 12/1975 | Fukushima et al. | 260/23 R |
| 3,931,449 | 1/1976 | Hirata et al. | 428/474 |
| 3,932,692 | 1/1976 | Hirata et al. | 428/474 |
| 3,932,693 | 1/1976 | Shaw | 428/518 |
| 3,932,693 | 1/1976 | Shaw et al. | 428/518 |
| 3,949,114 | 4/1976 | Viola et al. | 428/337 |
| 3,957,941 | 5/1976 | Kawaguchi | 264/234 |
| 3,972,865 | 8/1976 | McClain | 526/14 |
| 3,976,618 | 8/1976 | Takida | 260/40 R |
| 3,985,719 | 10/1976 | Hoyt et al. | 526/10 |
| 3,997,703 | 12/1976 | Nakashio et al. | 428/500 X |
| 4,003,810 | 1/1977 | Hoyt et al. | 204/159.14 |
| 4,003,963 | 1/1977 | Creasy | 264/289 X |
| 4,044,187 | 8/1977 | Kremkau | 428/212 |
| 4,055,698 | 10/1977 | Beery | 428/516 X |
| 4,058,904 | 11/1977 | Takida | 34/12 |
| 4,064,296 | 12/1977 | Bornstein et al. | 428/35 |
| 4,079,850 | 3/1978 | Suzuki et al. | 428/516 X |
| 4,082,854 | 4/1978 | Yamada et al. | 428/35 X |

FOREIGN PATENT DOCUMENTS 593929 10/1947 United Kingdom .
634140 3/1950 United Kingdom .
1057398 2/1967 United Kingdom .

Primary Examiner—Lorraine T. Kendell
Attorney, Agent, or Firm—Robert P. Auber; Ira S. Dorman; James W. Bock

[57] ABSTRACT

A delamination resistant multi-layer film comprises a core layer of vinyl alcohol polymers or copolymers such as polyvinyl alcohol or ethylene vinyl alcohol. Adhered to the core layer are one or more layers of a partially hydrolyzed vinyl acetate polymer or copolymer having functional groups in the polymer such that strong adhesion to the core layer is obtained. The core layer provides an excellent oxygen barrier, while the adjacent layers protect the core layer from degradation by exposure to water vapor. Additional layers of various polymer materials may be provided over the layers of partially hydrolyzed vinyl acetate. The film can be prepared by coextrusion techniques.

26 Claims, No Drawings

MULTI-LAYER BARRIER FILM

BACKGROUND OF THE INVENTION

1. Field of the Invention

This invention pertains generally to multilayer polymer films and to methods for producing the same.

2. Description of the Prior Art

Polyolefin films such as polyethylene and polypropylene are common packaging materials because of their relative low cost, heat sealability, and moisture resistance. However, these polyolefins have a fairly high permeability to gases including oxygen, so that, used alone, they are not adequate for packaging oxygen sensitive foods and other materials that degrade in the presence of oxygen or other atmospheric gases.

It is known that polymers and copolymers of vinyl alcohol, hereafter called vinyl alcohol films, have excellent resistance to permeation by gases, particularly to oxygen. Vinyl alcohol films include polyvinyl alcohol and ethylene vinyl alcohol copolymer. The desirable properties of the vinyl alcohol films degrade in the presence of moisture. Vinyl alcohol films also tend to be structurally brittle, particularly when formed in relatively thin layers, i.e. in the range of 1 mil or less. Thus, efforts have been made to laminate a vinyl alcohol web between two outer webs of polyolefin which provide a moisture barrier and structural support for the vinyl alcohol core. An example of such a structure, a core layer of ethylene vinyl alcohol blended with another polymer and sandwiched between two outer layers of polyolefin, is shown in the U.S. Patent to Nohara, et. al., U.S. Pat. No. 3,882,259. Since the oxygen barrier property of substantially pure vinyl alcohol polymer is superior to that of vinyl alcohol blends, it is desirable to produce a film having a substantially pure vinyl alcohol layer within polyolefin layers. However, substantially pure ethylene vinyl alcohol and polyvinyl alcohol do not bond well to many polymer films, particularly polyolefin films.

SUMMARY OF THE INVENTION

This invention provides a film structure in which a substantially pure polyvinyl alcohol or ethylene vinyl alcohol layer is joined with one or more polyolefin layers with adequate adhesion to prevent delamination.

A multi-layer film in accordance with the invention includes a core layer of substantially pure vinyl alcohol polymer or copolymer such as polyvinyl alcohol (PVOH) or ethylene vinyl alcohol copolymer (EVOH) adhered to at least one layer of a partially hydrolyzed polyvinyl acetate polymer or copolymer having surprisingly strong adhesion characteristics to the vinyl alcohol core layer. The multilayer film can be made by coextrusion. Because the core layer is formed of substantially pure polyvinyl alcohol or ethylene vinyl alcohol, the entire film may be made very thin while still retaining high oxygen impermeability. The partially hydrolyzed vinyl acetate layer and the core may be coextruded with additional layers of other polymers to provide an integrated film structure having a composite of the characteristics of the various films in the structure and which has sufficient adhesion between layers to resist delamination.

The partially hydrolyzed vinyl acetate polymers or copolymers that have been found to have suitable adhesion to the EVOH or PVOH core are polymers having dual functional groups, that is, vinyl alcohol groups to adhere to the EVOH or PVOH and vinyl acetate groups to adhere to outer layers such as polyolefins. Such suitable adherent polymers include partially hydrolyzed polyvinyl acetate and partially hydrolyzed ethylene vinyl acetate copolymer. Partially hydrolyzed ethylene vinyl acetate copolymer is distinguished from substantially fully hydrolyzed ethylene vinyl acetate (EVOH) by the presence of a significant quantity of unhydrolyzed vinyl acetate. Commercial grades of EVOH contain much less than 1.5% remaining vinyl acetate, whereas the partially hydrolized polyvinyl acetate polymer of this invention contains at least about 5% and preferably more than 10% remaining vinyl acetate.

The atmospheric gas barrier layer is preferably ethylene vinyl alcohol which is readily coextrusible with the partially hydrolyzed vinyl acetate layers and with additional layers. Dry ethylene vinyl alcohol copolymer is very much less permeable to oxygen than extrusion grade saran (vinylidine chloride). Heretofor, saran has been dominant in the field of oxygen barrier materials for films. The lower oxygen permeability of EVOH allows it to be used as a very thin layer. Polyvinyl alcohol also displays superior barrier properties, but is less easy to coextrude. Polyvinyl alcohol is better suited to laminated film structures wherein a polyvinyl alcohol core web is extrusion coated or otherwise plied with the adherent modified polyolefin layers.

In a preferred process for the production of the multilayer film, resins of the partially hydrolyzed vinyl acetate and the core barrier material are melted and coextruded as a cast film. Additional layers of polymer material similarly may be coextruded over the partially hydrolyzed vinyl acetate layers. Blown film coextrusion and water quench coextrusion may also be utilized. All such coextrusion processes yield a multi-layer film which has excellent adhesion between the layers and high resistance to passage of gas and moisture. Heat sealing of polyolefin outer layers is readily obtained. Thus, the multi-layer film product is well adapted to use in packaging food products as well as many non-food products which require moisture and oxygen barrier packaging.

Further objects, features, and advantages of the invention will be apparent from the following detailed description illustrating preferred embodiments of the invention.

DESCRIPTION OF THE PREFERRED EMBODIMENTS

The multi-layer film of the invention includes a core of substantially pure polyvinyl alcohol (PVOH), or ethylene vinyl alcohol (EVOH). Excellent adhesion of the layers in the film is obtained without the need to introduce bond promoting materials into the core layer, and it is highly preferred that they be eliminated from the core layer since introduction of such extraneous materials may reduce the oxygen barrier properties of the core. As a result, the core layer may be made quite thin, in the range of 0.1 mil or less, while still obtaining adequate oxygen barrier properties.

Vinyl alcohol polymers and copolymers suitable for extrusion are available commercially. Kuraray of Japan produces an ethylene vinyl alcohol copolymer under the designation "EP-F" which has 32 to 36% ethylene, a molecular weight of 29,500 and a melting point of 356° F. Other manufacturers produce suitable ethylene vinyl alcohol copolymers. One suitable copolymer has about 29% ethylene, a molecular weight of 22,000, and a melting point of 365° F. Another has about 40% ethylene, a molecular weight of 26,000, and a melting point of 327° F. The film structures reported in the tables which follow were made with these commercial EVOH resins.

The partially hydrolyzed vinyl acetate polymers or copolymers which form the layers adjacent the core layer are vinyl acetate-vinyl alcohol copolymer or vinyl alcohol-ethylene-vinyl acetate terpolymer.

An example of a copolymer fabricated by hydrolysis of pure vinyl acetate is:

(1) $(A)_x$-B-$(A)_y$

An example of a terpolymer fabricated by hydrolysis of ethylene vinyl acetate copolymer is:

(2) $(A)_x$-$(C)_y$-B-$(C)_a$-$(A)_b$ etc.

In the above formulae:

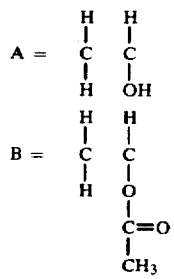
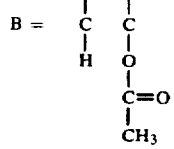
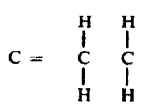

The mole percentage of A lies between about 20 and 95%; the mole percentage of B lies between about 5 and 30%; and the mole percentage of C lies between 0 and about 70%.

Suitable resins are available from U.S. Industrial Chemicals Co., Div. National Distillers & Chemical Corp. (U.S.I.) under the designations S-2037 and S-2038. 2037 has a composition according to formula 1 and contains about 13% vinyl acetate and about 87% vinyl alcohol. S-2038 has a composition according to formula 2 and contains about 11% vinyl acetate, about 39% vinyl alcohol, and about 50% ethylene. Both are readily coextrusible with EVOH and have melt temperatures similar to that of EVOH in the order of 400° F.

Other materials used for layers overlying the partially hydrolyzed vinyl acetate layers, include by way of illustration, high, medium and low density polyethylene, polypropylene, modified polyolefins, polyolefin copolymers such as ethylene vinyl acetate copolymer and ethylene acrylic acid copolymer, blends two or more of the foregoing polymers, nylon, and ionomers such as those sold under the name "Surlyn" by duPont. Five or more layers can be coextruded to produce a film having a plurality of desired properties in a single pass.

Examples of coextruded film structures in accordance with the present invention which have been made and tested are reported in the following tables. Table I reports the adhesion between layers of various structures. The data was obtained using an Instron test device which reveals the force in pounds per inch of film width required to separate a film structure.

TABLE I

| Example Number | Film Structure | Thickness (mils) | Adhesion lbs./inch |
| --- | --- | --- | --- |
| 1 | 2037/EVOH | 5.5–5.8 | 2.2–2.4 |
| 2 | 2037/EVOH | 2.6–3.3 | 1.1–1.2 |
| 3 | 2037/LDPE | 2.6–3.3 | 2.0 |
| 4 | 2037/EVOH | 5.5–5.8 | 1.6–2.0 |
| 5 | 40% MDPE/5% 2037/10% EVOH/5% 2037/40% MDPE | 3.0 | 0.1–1.0 (MDPE-2037) DMS (2037-EVOH) |
| 6 | 2038/EVOH | 2.6–3.2 | 1.1 |
| 7 | 2038/EVOH | 5.8 | 2.9 |
| 8 | 2038/EVOH | 6.6 | 2.8 |
| 9 | 2038/EVOH | 8.8 | 1.4 |
| 10 | 2038/LDPE | 3.6 | 0.1 |
| 11 | 2038/9.5% EVA | 4.6 | 0.8 |
| 12 | 2038/12% EVA | 2.8 | 0.9 |
| 13 | 2038/14% EVA | 3.0 | 0.7 |
| 14 | 40% MDPE/5% 2038/10% EVOH/5% 2038/40% MDPE | 3.0 | 0.1 (MDPE-2038) DNS (2038-EVOH) |

In the table LDPE and MDPE mean low and medium density polyethylene; EVA means ethylene vinyl acetate copolymer, and 2037 and 2038 indicate the U.S.I. resins before identified. "DNS" means that the sample did not separate in the adhesion test.

Containers were made from the films of the examples 5 and 14 by heat sealing to form a pouch or by thermoforming to make containers in which foods were packaged and stored to evaluate the performance of the films. The containers were successful.

We claim:

1. A delamination resistant multi-layer structure comprising a barrier layer of a substantially pure polymer or copolymer of vinyl alcohol having less than about 1.5 mole percent remaining vinyl acetate groups and an adjacent adherent layer consisting essentially of a partially hydrolyzed vinyl acetate polymer or copolymer which has at least about 5 mole percent remaining vinyl acetate groups.

2. The multi-layer structure of claim 1 wherein the barrier layer is adhered between adherent layers of the partially hydrolyzed vinyl acetate polymer or copolymer.

3. The multi-layer structure of claim 1 wherein a further layer of a polymer is adhered to the adherent layer.

4. The multi-layer structure of claim 2 wherein a further layer of polymer is adhered to at least one of the adherent layers.

5. The multi-layer structure of claim 1 wherein the barrier layer is ethylene vinyl alcohol copolymer.

6. The multi-layer structure of claim 1 wherein the adherent layer consists essentially of partially hydrolyzed polyvinyl acetate.

7. The multi-layer structure of claim 1 wherein the adherent layer consists essentially of partially hydrolyzed ethylene vinyl acetate copolymer.

8. The multi-layer structure of claim 3 wherein the further layer is a polyolefin.

9. The multi-layer structure of claim 3 wherein the further layer is nylon.

10. The multi-layer structure of claim 3 wherein the further layer is ethylene vinyl acetate copolymer.

11. The multi-layer structure of claim 3 wherein the further layer is an ionomer.

12. A delamination resistant coextruded multi-layer structure comprising a barrier layer of substantially pure ethylene vinyl alcohol copolymer having less than about 1.5 mole percent remaining vinyl acetate groups adhered between adjacent adherent layers consisting essentially of a partially hydrolized vinyl acetate polymer or copolymer which has at least about 5 mole percent remaining vinyl acetate groups.

13. The multi-layer structure of claim 12 wherein the adherent layers consist essentially of partially hydrolyzed polyvinyl acetate.

14. The multi-layer structure of claim 12 wherein the adherent layers consist essentially of partially hydrolyzed ethylene vinyl acetate copolymer.

15. The multi-layer structure of claim 13 further having a layer over at least one of the adherent layers comprising a polymer selected from the group consisting of polyethylene, polypropylene, ethylene vinyl acetate copolymer, ethylene acrylic acid copolymer, blends of two or more of the foregoing polymers, nylon, and ionomers.

16. The multi-layer structure of claim 14 further having a layer over at least one of the adherent layers comprising a polymer selected from the group consisting of polyethylene, polypropylene, ethylene vinyl acetate copolymer, ethylene acrylic acid copolymer, blends of two or more of the foregoing polymers, nylon, and ionomers.

17. A delamination resistant coextruded multi-layer structure comprising
 (a) a core layer of a substantially pure ethylene vinyl alcohol copolymer having less than about 1.5 mole percent remaining vinyl acetate groups;
 (b) an adherent layer adhered on each side of the core layer, the adherent layer consisting essentially of partially hydrolyzed polyvinyl acetate or partially hydrolyzed ethylene-vinyl acetate copolymer, to result in a polymer having at least about 5 mole percent remaining vinyl acetate groups;
 (c) an outer polymer layer over at least one of the adherent layers, the outer layers being independently selected from the group which consists of polyethylene, polypropylene, ethylene vinyl acetate copolymer, ethylene acrylic acid copolymer, blends of two or more of the foregoing polymers, nylon, and ionomers.

18. A delamination resistant coextruded multi-layer structure comprising a barrier layer of substantially pure ethylene vinyl alcohol copolymer and an adjacent adherent layer which consists essentially of partially hydrolyzed ethylene vinyl acetate copolymer and having at least about 5 mole percent remaining vinyl acetate.

19. The structure of claim 18 having about 11 mole percent remaining vinyl acetate.

20. A delamination resistant coextruded multi-layer structure comprising a barrier layer of substantially pure ethylene vinyl alcohol copolymer and an adjacent adherent layer of partially hydrolyzed polyvinyl acetate and having at least about 5 mole percent remaining vinyl acetate.

21. The structure of claim 20 having about 13 mole percent remaining vinyl acetate.

22. A container formed from the structure of claim 1.

23. A container formed from the structure of claim 12.

24. A container formed from the structure of claim 17.

25. A container formed from the structure of claim 19.

26. A container formed from the structure of claim 21.

* * * * *